(12) United States Patent  
Lai et al.

(10) Patent No.: US 9,727,391 B2  
(45) Date of Patent: Aug. 8, 2017

(54) METHOD FOR PERFORMING TASK ON UNIFIED INFORMATION UNITS IN A PERSONAL WORKSPACE

(71) Applicant: ABLE WORLD INTERNATIONAL LIMITED, Virgin Islands, British (VG)

(72) Inventors: Chen-Chun Lai, Taipei (TW); Shih-Cheng Lan, Taipei (TW); Shih-Yi Yeh, Taipei (TW); Chun-Hsiao Lin, New Taipei (TW); Wai-Tung Cheung, Taipei (TW); Ho-Cheung Cheung, Taipei (TW)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 0 days.

(21) Appl. No.: 14/325,466

(22) Filed: Jul. 8, 2014

(65) Prior Publication Data

US 2016/0011917 A1  Jan. 14, 2016

(51) Int. Cl.
G06F 9/45 (2006.01)
G06F 9/54 (2006.01)

(52) U.S. Cl.
CPC ................................ *G06F 9/54* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| 2002/0054084 | A1* | 5/2002 | Udell | G06F 9/445 715/738 |
| 2004/0243980 | A1 | 12/2004 | Das | |
| 2007/0113066 | A1* | 5/2007 | Samba | G06F 8/61 713/1 |
| 2013/0246901 | A1 | 9/2013 | Massand | |
| 2014/0024348 | A1* | 1/2014 | Hurst | H04M 3/5232 455/414.1 |
| 2014/0068589 | A1* | 3/2014 | Barak | G06F 9/445 717/170 |

(Continued)

FOREIGN PATENT DOCUMENTS

| CN | 1525312 A | 9/2004 |
| CN | 101814028 A | 8/2010 |

(Continued)

OTHER PUBLICATIONS

Berezovskiy et al., A framework for dynamic data source identification and orchestration on the Web, 2010.*

*Primary Examiner* — H S Sough  
*Assistant Examiner* — Zhan Chen  
(74) *Attorney, Agent, or Firm* — WPAT, PC

(57) ABSTRACT

The method for performing a task on unified information units in a personal workspace, comprising: plugging at least one information importer and at least one unified tool to a personal workspace; obtaining at least one information via the at least one information importer from at least one of a plurality of information sources and unifying the at least one information into at least one unified information unit; arranging the at least one unified information unit and the at least one unified tool in the personal workspace; and performing the task for accessing or controlling the at least one unified information unit by using the at least one unified tool.

15 Claims, 10 Drawing Sheets

(56) References Cited

U.S. PATENT DOCUMENTS

2014/0157173 A1* 6/2014 Takayama ........... G06F 9/44505
715/771
2014/0237375 A1* 8/2014 Schachtel ......... G06F 17/30991
715/741

FOREIGN PATENT DOCUMENTS

| CN | 102929638 A | 2/2013 |
| CN | 103092980 A | 5/2013 |
| CN | 103188567 A | 7/2013 |
| CN | 103428525 A | 12/2013 |
| CN | 103631598 A | 3/2014 |
| KR | 20140021091 A | 2/2014 |
| TW | 201329734 A | 7/2013 |

* cited by examiner

METHOD FOR PERFORMING TASK ON UNIFIED INFORMATION UNITS IN A PERSONAL WORKSPACE

FIELD OF THE INVENTION

The present invention relates to a method for performing a task on unified information units in a personal workspace.

DESCRIPTION OF PRIOR ART

Currently, many websites, operation systems or applications are rapidly developed and become increasingly popular. These websites, systems and applications provide convenience and changes for users but also bring problems to the users, because they are independent and incompatible with one another. In other words, the software vendors develop individually websites, systems or applications which do not share a unified mechanism. As a result, different operation systems and applications can not cooperatively operate even with respect to data or tasks of the same class. Therefore, the users need to open many working interfaces of the applications and use specific functions or services of them for performing a task at present. It is complicated, inefficient and even infeasible for the users to perform the task, because there is no unified workspace to integrate these applications.

For example, a user can use Photo shop or PhotoImpact to complete an image processing. PhotoImpact provides a simple module for the user to easily process an image and Photoshop provides a professional tool for advanced processing. If the user wants to apply a specific function or tool of Photoshop and a specific function or tool of PhotoImpact to process the image at the same time, the user needs to respectively operate Photoshop and PhotoImpact at present. Although these two applications can be applied in the same operation system, the tools of PhotoImpact are not allowed to be applied into the interface of Photoshop. In general, the tools or functions of the current applications are unable to be applied mutually. The user cannot use a single working environment or workspace to access or apply all of the functions or services of these applications. Therefore, the independence and incompatibleness of these websites, operation systems and applications block the freedom of the data/information exchange and the utilization of the functions or tools.

At present, a user can obtain much data or information from different information sources such as website, cloud storage, or computer device. These information sources have isolated operation interfaces, respectively. Therefore, it causes these data or information to be restricted by these isolated interfaces and are not easy or free for the user to transfer, access, or integrate. In the above situation, it makes trouble for the user in performing the work to process scattered data or information. For this reason, the user may need a workspace to unify these data or information from the different information sources, and to provide a centralized interface to integrate and process these data or information efficiently.

In addition, the updated software versions in the operation systems also make trouble to a user. Because a current operation system only permits one software version for each application, the user must choose one software version to use. Although the updated software provides a new and convenient function or service to the user, some users may still prefer to use the function or service of the old version. However most software vendors once provide the function or service of the new version, they will stop furnishing function or service of the old version. Therefore, the user is unable to freely choose the function of the old version she/he likes. Thus, the user needs a workspace which allows the collaborative operation of many services supported by different software versions.

Accordingly, what is needed is a unified workspace that permits any application or service of the different websites, operation systems or applications to be performed and provides a user with a free arrangement mechanism of these applications or services to create a personal working environment.

Meanwhile, while implementing the present invention, reference may be made to the U.S. patent application Ser. No. 14/324,069, entitled "A Method of Unifying Information and Tool from a Plurality of Information Sources" which was filed by and assigned to the same applicant, and whose content is incorporated by its entirety herein by reference.

SUMMARY OF THE INVENTION

The present invention provides a method for performing a task on unified information units in a personal workspace. The method of the present invention comprises: plugging at least one information importer and at least one unified tool to a personal workspace; obtaining at least one information via the at least one information importer from at least one of a plurality of information sources and unifying the at least one information into at least one unified information unit; arranging the at least one unified information unit and the at least one unified tool in the personal workspace; and performing the task for accessing or controlling the at least one unified information unit by using the at least one unified tool.

DETAILED DESCRIPTION OF THE INVENTION

Figure 1:
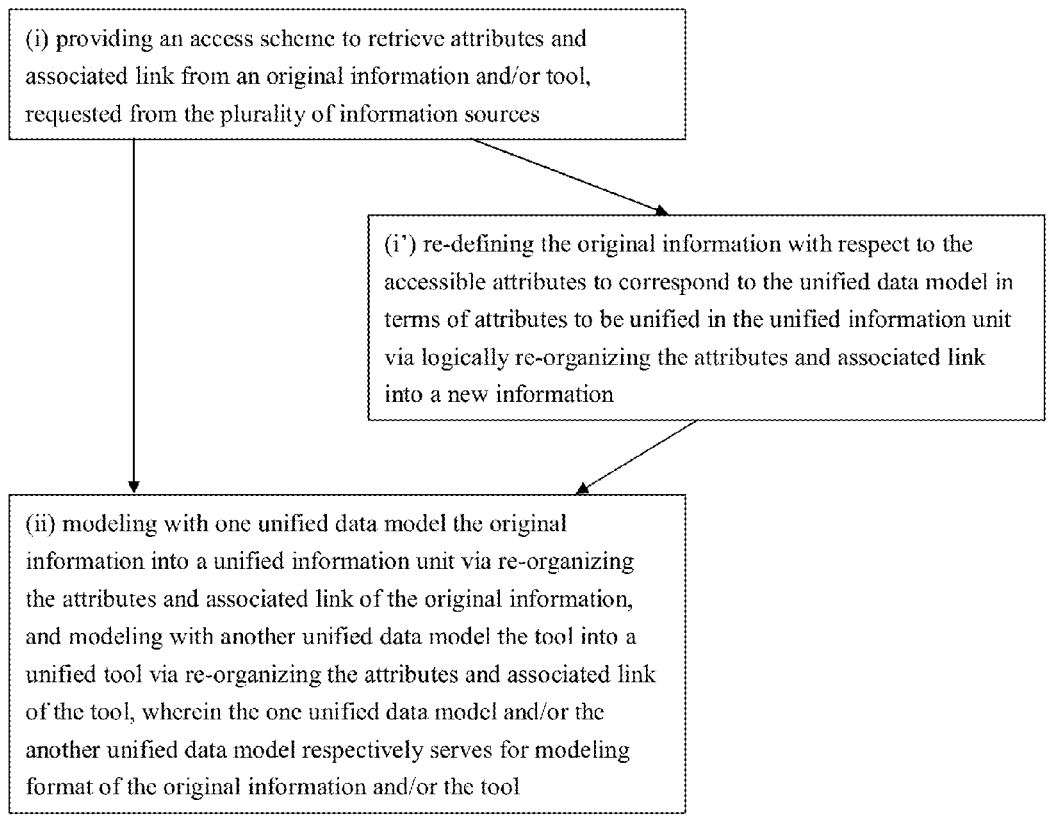
FIG. 1 shows a flow chart of a method of unifying information and tool provided by U.S. patent application Ser. No. 14/324,069.

The present invention is more fully appreciated by reference to the following description, including the following glossary of terms that contain unified information unit and unified tool and the concluding examples. For the sake of brevity, the disclosures of the publications, including patents, cited in this specification are herein incorporated by reference.

The present invention is developed to provide a unified and user-orientated workspace which provides the following advantages:
1. Comparing to the present operation systems, the unified workspace brings no boundary in sharing information sources aside from using internet. That is, with the provisions of unifying the information and the tool, respectively from different information sources, into a unified information unit and a unified tool in a workspace, dedicated to a user, and of processing the unified information unit(s) with the unified tool(s) in the workspace for completing some specific tasks, all the information and tool(s) form different information sources will be used by the user in the workspace.
2. The unified information unit(s) and tool(s) in the workspace of the present invention can be interactive. That is, the unified tool is allowed to process a corresponding unified information unit, or a unified information unit is served as a self-driving unit capable of accessing a unified tool for accomplishing a task.
3. When an operating system is updated, other software may encounter incompatible problems causing inconveniences to the users. The users are forced to learn new operating system as well as the updated version of software. The present invention creates a workspace without new version update problem as compared with other operation systems.
4. The present invention provides a user orientated workspace for the users according to ideal unified information unit or unified tool they desire to use in their workspace.
5. The workspace is able to access and control the multiple information from the different sources.

As mentioned in prior arts, the independence and incompatibleness of these operation systems and applications limit the freedom of the data and information. For solving the above problems, the present invention discloses a method for performing a task with respect to a plurality of unified information units in a personal workspace.

The present invention provides a method for performing a task on unified information units in a personal workspace, comprising: plugging at least one information importer and at least one unified tool to a personal workspace; obtaining at least one information via the at least one information importer from at least one of a plurality of information sources and unifying the at least one information into at least one unified information unit; arranging the at least one unified information unit and the at least one unified tool in the personal workspace; and performing the task for accessing or controlling the at least one unified information unit by using the at least one unified tool.

Herein, the obtaining of the "unified tool" and the "unified information unit" may be referred to the U.S. patent application Ser. No. 14/324,069.

As depicted in FIG. 1, the above-mentioned US patent application discloses a method of unifying information and tool from a plurality of information sources, comprising:
(i) providing an access scheme to retrieve attributes and associated link from an original information and/or tool, requested from the plurality of information sources; and
(ii) modeling with one unified data model the original information into a unified information unit via re-organizing the attributes and associated link of the original information, and modeling with another unified data model the tool into a unified tool via re-organizing the attributes and associated link of the tool, wherein the one unified data model and/or the another unified data model respectively serves for modeling format of the original information and/or the tool.

In modeling the format of the information unit, basic properties of the unified information unit include a first "type", i.e. a data type; and a first "link", indicating where the information is located, in which the data type is defined by the first "type" with data content of the information being obtained via the first "link". In one embodiment, the first "link" could refer to a URL in a remote end or local end, or some block address in a memory while executing a program.

For generating a unified information unit, the unified information unit is directly produced according to the attributes and the associated link if the original information corresponds to the unified data model, and the unified information unit is indirectly produced by logically recombining the attributes and the associated link into a new information, i.e. being corresponded, if the original information does not correspond to the unified data model.

In one embodiment, the unified information unit is directly produced if the attributes accessible from the original information correspond to attributes to be unified in the unified information unit.

In another embodiment, if the attributes accessible from the original information does not correspond to the attributes to be unified in the unified information unit, the method of the present invention further comprising a step, before the step of modeling, re-defining the original information with respect to the accessible attributes to correspond to the unified data model in terms of attributes to be unified in the unified information unit via logically re-organizing the attributes and associated link into a new information, i.e. being corresponded, thereby indirectly producing the unified information unit.

For preparing a unified tool, the unified tool is directly produced according to the attributes and the associated link if the tool obtained from the information source is compatible with an execution environment of the unified workspace (website platform), i.e. corresponding to another unified data model. The unified tool is indirectly produced via an adapter to execute interface implementation with the unified web site platform and via a software development kit (SDK) of the original tool if the original tool from the information source is incompatible with the execution environment of the unified website platform.

Further, in modeling the format of the tool, basic properties of the unified tool include a second type, i.e. a component type; and a second link, indicating where the component of the unified tool is located, in which the component type is defined by the second type, while obtaining a physical component essential to the unified tool for proceeding with plugging in, managing or executing. In one embodiment, the second link refers to a URL in a remote end or local end, or some block address in a memory while executing a program. In addition, the basic properties of the unified tool further comprise a processible information type for indicating the unified information type of the tool capable to process with, in which the processible information type is in a number from zero to a multiple number.

In one embodiment, the method further comprises a step of producing a new unified information unit and/or unified tool, re-organized from desired attributes and an original link, without downloading the original information and/or tool.

In the method, the original information is a file, web page, database row, policy, rule or any data accessible in associated machines and servers and the original tool is a utility, widget, intelligent agent, application, service, or any executable component accessible in associated machines and servers.

Figure 2:
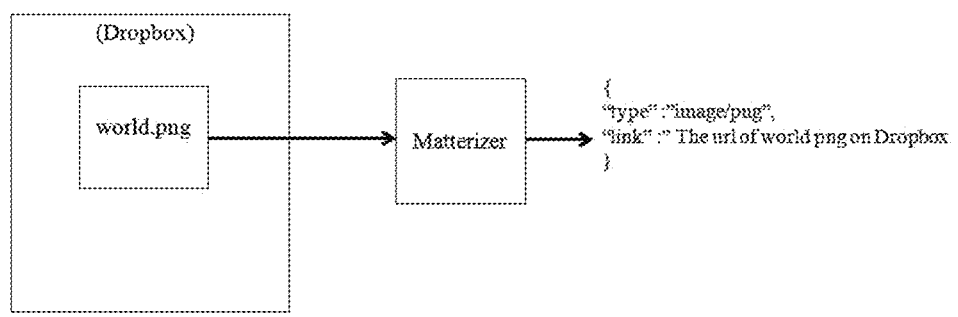
FIG. 2 illustrates one example of modeling information into a unified information unit provided by U.S. patent application Ser. No. 14/324,069.

As shown in FIG. 2, original information of an image file in a format of portable network graphics (png) such as world.png is obtained from an information source of Dropbox. The matterizer is a means or device to perform procedures of unifying information and tool which are according to the steps of the FIG. 1. The unified output model of the matterizer herein is to model a portable network graphics. The matterizer models world.png with the unified output model the attributes and the associated link of the file to one unified information unit as follows under the condition that the world.png with a png format corresponds to the unified output model.

{
"type":"image.png",
"link":"The url of world.png on Dropbox
}.

That is, the unified information unit is directly produced if attributes accessible from the original information correspond to attributes to be unified in the unified information unit.

Thus, any photo management app(s) that can recognize the unified data model above can access world.png through the produced new unified information unit.

Figure 3:
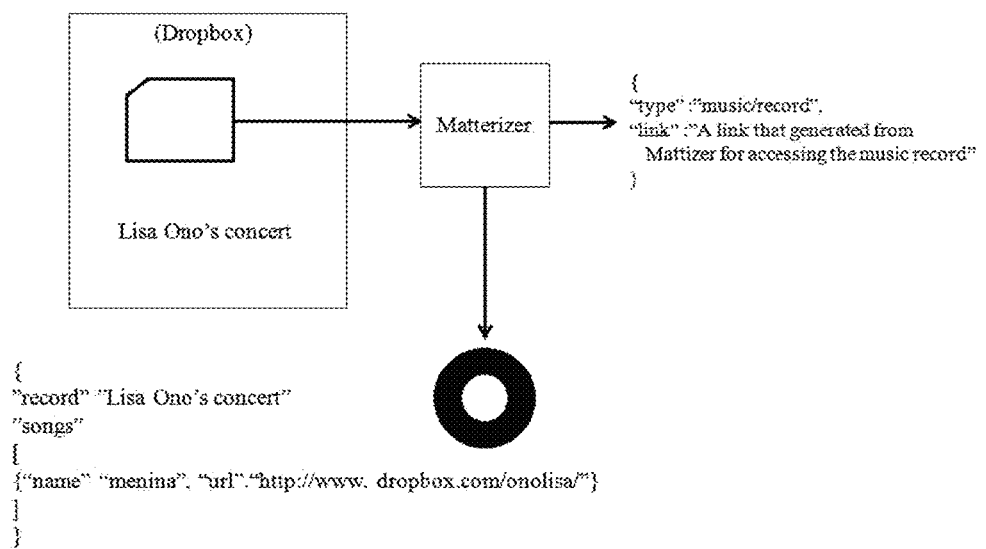
FIG. 3 illustrates one example of re-defining and modeling information into a unified information unit provided by U.S. patent application Ser. No. 14/324,069.

As shown in FIG. 3, another original information of a folder of Dropbox stores Lisa Ono's concert. The unified output model of the matterizer herein is to model a CD playlist which is formatted in JSON structure. The folder structure of Lisa Ono's concert in Dropbox does not directly correspond to the formatted CD playlist structure but the attributes of each structure are essentially similar. The folder can map to a music record and the files in the folder can map to songs in the music record. Thus, the matterizer can first re-define folder structure into the formatted CD playlist structure by re-organizing the attributes and the associated link of the folder and produce a new CD playlist as follows:

{
"Record" "Lisa Ono's concert"
"songs"
[
{"name" "menina","url"."http://www.dropbox.com/ono-lisa/"}
]
}.

After a new CD playlist is produced, the matterizer separates the attributes from the description and the associated link of the new CD playlist, and re-organizes the new attributes such as the music/record and the associated link of the information into a unified information unit as follows:

{
"type":"music/record",
"link":"A link that generated from matterizer for accessing the music record (the created CD playlist)"
}.

As illustrated in FIG. 1, a step (i') proceeds before the step (ii) of modeling. In step (i'), the unified information unit is indirectly produced by re-defining the original information with respect to the accessible attributes to correspond to the unified data model in terms of attributes to be unified in the information unit via logically re-organizing the attributes and associated link into a new information, i.e. being corresponded, thereby indirectly producing the unified information unit, provided that attributes accessible from the original information does not correspond to attributes to be unified in the unified information unit.

Thus, any media player(s) that can recognize the aforementioned unified data model can access songs (playlist) through the produced new unified information unit. In conclusion, by separating data management app(s) (Dropbox, Evernote, etc.) and contents in the data management app, the matterizer can re-define the information and re-organize the associated link and attributes to a new unified information unit.

Figure 4:
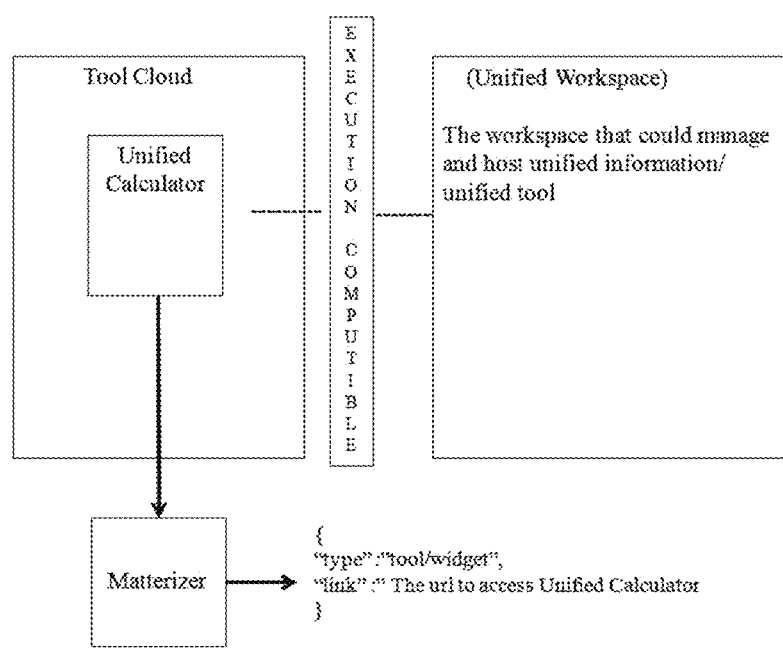
FIG. 4 illustrates one example of modeling a tool into a unified tool provided by U.S. patent application Ser. No. 14/324,069.

As shown in FIG. 4, a tool (widget) of Unified Calculator obtained from a Tool Cloud is compatible with the execution environment of the unified workspace. The unified output model of the matterizer herein is to model a tool (widget) which is compatible with the execution environment of the unified workspace. Under the condition that the compatible Unified Calculator corresponds to the unified output model, the matterizer models Unified Calculator with the unified output model to one unified tool in terms of the attributes and the associated link of the tool (widget) as follows:

{
"type":"tool/widget",
"link": "The URL to access Unified Calculator"
}.

That is, the unified tool is directly produced if the attributes accessible from the original tool is compatible with the execution environment of the unified workspace.

Thus, any other workspace that can recognize the aforementioned unified data model and provide compatible execution environment can access the unified calculator through the produced new unified tool.

Figure 5:
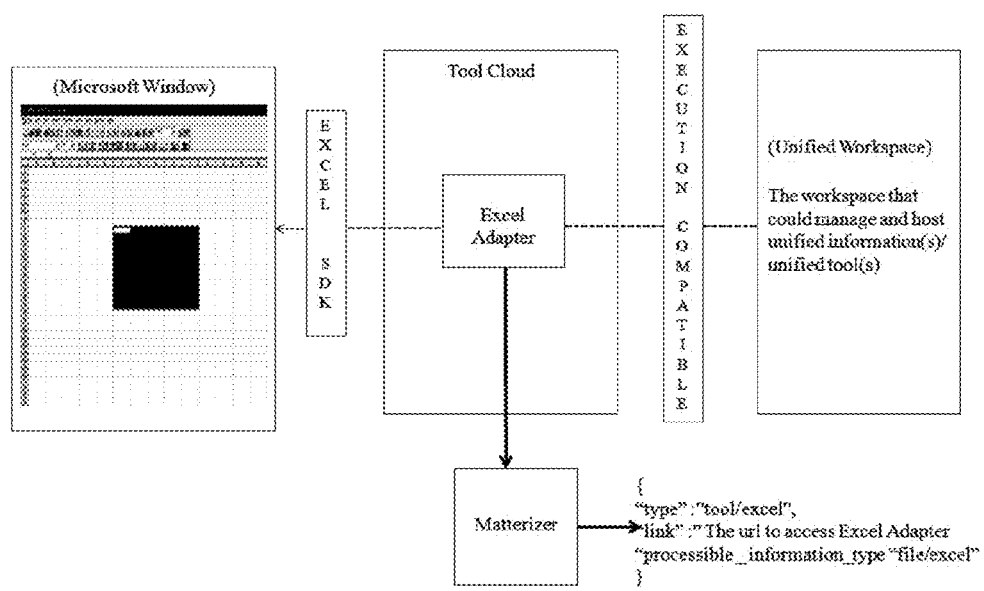
FIG. 5 illustrates one example of re-defining and modeling a tool into a unified tool provided by U.S. patent application Ser. No. 14/324,069.

In some cases, the software or tools can only run on a particular operating system. For example, as shown in FIG. 5, Excel in Microsoft Window is incompatible with the execution environment of a unified workspace. To solve this problem and enable the software or tools to run in the unified workspace, an Excel adapter in Tool Cloud is used to execute interface implementation with the unified workspace and drive an Excel program to complete an original task via an Excel software development kit (SDK). The unified output model of the matterizer herein is to model an Excel tool which is compatible with the execution environment of the unified workspace. Then, the matterizer separates the attributes from the description and the associated link of the Excel adapter and re-organizes the attributes and associated link of the Excel adapter into one complex unified tool as follows:

{
"type": "tool/excel".
"link": "The url to access Excel Adapter",
"processible_information_type": "file/excel"
}.

Thus, the unified workspace and all other workspace that can provide compatible execution environment can access the Excel in Microsoft Windows indirectly via accessing the Excel adapter based on the unified tool.

In view of these examples which are illustrated in FIGS. 4 and 5, the unified tool is directly produced according to the attributes and the associated link if the tool obtained from the information source is compatible with an execution environment of the unified website platform, i.e. corresponding to the unified data model. The unified tool is indirectly produced via an adapter to execute interface implementation with the unified website platform and via a software development kit (SDK) of the tool therefrom if the tool from the information source is incompatible with the execution environment of the unified website platform.

Further, according to the method of the present invention, in modeling the format of the tool, basic properties of the unified tool include a second type, i.e. a component type; and a second link, indicating where the component of the unified tool is located, in which the component type is defined by the second type, while obtaining a physical component essential to the unified tool for proceeding with plugging in, managing or executing, the second link refers to a second URL in a remote end or local end, or some block address in a memory while executing a program, and the basic properties of the unified tool further comprise a processible information type for indicating the unified information type of the tool capable of processing with, in which the processible information type is in a number from zero to a multiple number.

In one embodiment, the step of the arranging is to add or delete the at least one unified information unit in the personal workspace. In another wherein the step of the arranging is to load or unload the at least one unified tool in the personal workspace In one embodiment, the step of performing the task comprises use of the at least one unified tool to access or control a corresponding unified information unit.

In another embodiment, the step of performing the task comprises use of the at least one unified information unit, serving as a self-driving unit, to cooperate with the at least one unified tool to complete the task. In a preferred embodiment, the step of arranging further comprises grouping and placing the at least one unified information unit or the at least one unified tool in a specific area of the personal workspace.

In one embodiment, the at least one of a plurality of information sources is internet services, non-transitory computer usable storage mediums, or mobile device storage mediums. In a preferred embodiment, the information is a file, web page, database row, policy, rule or any data accessible in associated machines and servers.

In one embodiment, the at least one tool is a utility, widget, intelligent agent, application, service, or any executable component accessible in associated machines and servers.

In another embodiment, performing the task for accessing or controlling further comprises choosing a preset unified tool for supporting the unified information unit to access or control according to an attribute of the unified information unit via the personal workspace. In a preferred embodiment, performing the task for accessing or controlling further comprises dragging the unified information unit to be accessed or controlled and dropping the same to the unified tool for accessing or controlling. In a more preferred embodiment, performing the task for accessing or controlling further comprises dragging the unified tool for accessing or controlling and dropping the same to the unified information unit to be accessed or controlled.

In another embodiment, the step of unifying the at least one information further comprises a step of plugging the at least one information importer into the personal workspace via a unified script. In a preferred embodiment, plugging the at least one unified tool further comprises a step of directly plugging and equipping the at least one tool that is requested from the at least one of a plurality of information sources into the personal workspace via a unified script provided that the at least one tool is a compatible tool. In a more preferred embodiment, plugging the at least one unified tool further comprises a step of indirectly plugging the at least one tool that is requested from the at least one of a plurality of information sources into the personal workspace via an compatible adapter and a unified script provided that the at least one tool is an incompatible tool.

In one embodiment, the compatible tool and compatible adapter are each a unified tool.

In another preferred embodiment for performing a lot of unified information units gathered from the information sources in one workspace to complete different tasks, the user can choose a preset unified tool for supporting the unified information unit to access or control according to an attribute of the unified information unit via the workspace.

According to the present invention, the personal workspace is a working environment, or platform that is built up by a microkernel to host the at least one unified information unit and the at least one unified tool. And the microkernel is configurable via a unified script as an intermediate language to plug and equip the at least one information importer and the at least one unified tool.

According to the present invention, the working environment is configurable via a unified script as an intermediate language to plug and equip at least one unified information unit and the at least one unified tool.

The present invention further comprises a computer program product for performing a task in a personal workspace, comprising program code for executing the following steps when the program product is executed by a computer, the steps comprising: plugging at least one information importer and at least one unified tool to a personal workspace; obtaining at least one information via the at least one information importer from at least one of a plurality of information sources and unifying the at least one information into at least one unified information unit; arranging the at least one unified information unit and the at least one unified tool in the personal workspace; and performing the task for accessing or controlling the at least one unified information unit by using the at least one unified tool.

The present invention further comprises a system for performing a task on unified information units in a personal workspace, comprising: means for plugging at least one information importer and at least one unified tool to a personal workspace; means for obtaining at least one information via the at least one information importer from at least one of a plurality of information sources and unifying the at least one information into at least one unified information unit; means for arranging the at least one unified information unit and the at least one unified tool in the personal workspace; and means for performing the task for accessing or controlling the at least one unified information unit by using the at least one unified tool.

Example

The examples below are non-limiting and are merely representative of various aspects and features of the present invention.

Figure 6:
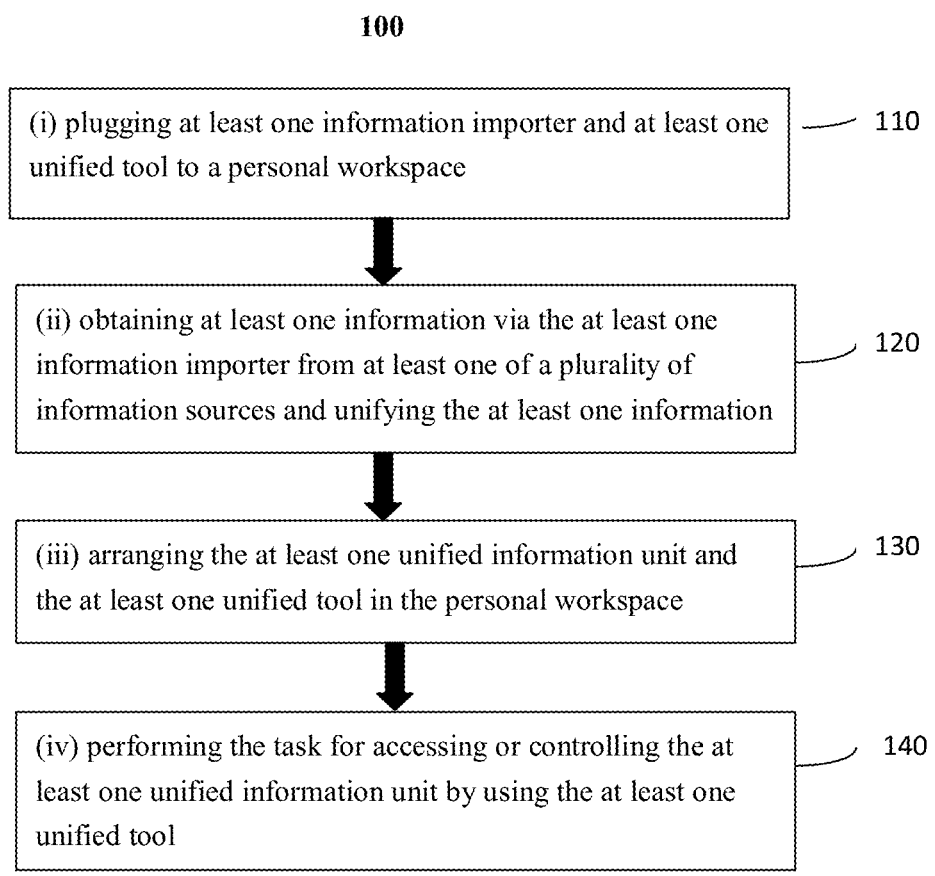
FIG. 6 is a flow chart showing a method for performing a task on a plurality of unified information units in a personal workspace according to the present invention.

As shown in FIG. 6, a method for performing a task on unified information units in a personal workspace 100, comprising: step 110 plugging at least one information importer and at least one unified tool to a personal workspace; step 120 obtaining at least one information via the at least one information importer from at least one of a plurality of information sources and unifying the at least one information into at least one unified information unit; step 130 arranging the at least one unified information unit and the at least one unified tool in the personal workspace; and step 140 performing the task for accessing or controlling the at least one unified information unit by using the at least one unified tool.

A plurality of information sources, in the most restricted technical sense, are a sequence of symbols that can be interpreted as an useful message to organize and label data, including: websites, intranets, online communities, software, books, database and other media of information.

Firstly, editing a unified script as an intermediate language realized in the present implementation that allows software components to be plugged and be equipped with converting functions of different formations, which can convert the information from different information sources into one unified information unit. The software component can be implemented as Java Bean, COM, or any kind of pluggable component architecture.

In one embodiment of the method of the present invention, the step of unifying the at least one information further comprises the step 110 of plugging at least one information importer into the personal workspace.

The step 120 includes obtaining at least one information (e.g. the information is a file, web page, database row, policy, rule or any data accessible in associated machines and servers) via the at least one information importer from at least one of a plurality of information sources and unifying the at least one information into at least one unified information unit; which was obtained after the plurality of information sources such as websites, intranets, online communities, software, books, database, other media of information and so on were partly/all fetched as a plurality of unified information unit.

A lot of unified information units gathered from the information sources are provided to the workspace in preparation for different tasks utilized by the user.

Figure 7:
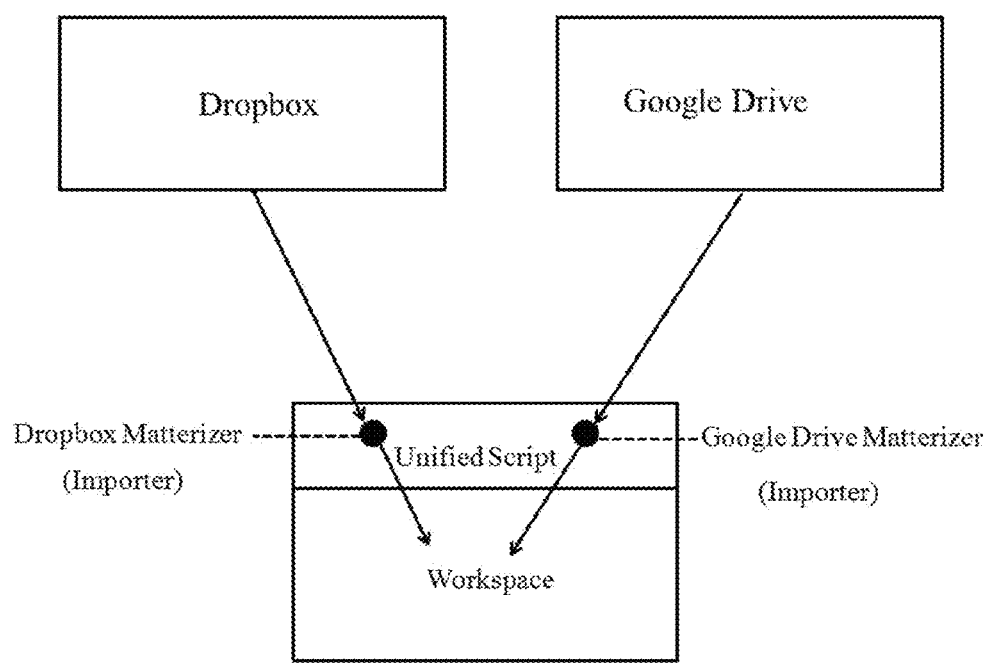
FIG. 7 is an example for editing a unified Script as an intermediate language in the workspace.

As shown in FIG. 7, an example of the step 120 of FIG. 6 is provided to elaborate for editing a unified script as an intermediate language in the workspace.

Dropbox is an information source of workspace. Dropbox Matterizer (Importer) is a component unifying data in Dropbox to unified information units. Dropbox Matterizer is configurable through a unified Script and may be one of source providers for the workspace.

Google Drive is also an information source of workspace. Google Drive Matterizer (Importer) is a component unifying data in Google Drive to unified information units. Google Drive Matterizer is configurable through a unified script and may be one of source providers for the workspace.

After unifying procedures, two aforementioned unified information units are allowed to enter together into the same workspace.

The step 120 of FIG. 6 is elaborated which comprises obtaining at least one tool, (e.g. the tool is a utility, widget, intelligent agent, application, service, or any executable component accessible in associated machines and servers) requested from at least one of the plurality of information sources and unifying the at least one tool into a unified tool.

In one embodiment of the method of the present invention, plugging the at least one unified tool further comprises a step of directly plugging and equipping the at least one tool that is requested from the at least one of a plurality of information sources into the personal workspace via a unified script provided that the at least one tool is a compatible tool.

And a step of indirectly plugging the at least one tool that is requested from the at least one of a plurality of information sources into the personal workspace via a compatible adapter and a unified script provided that the at least one tool is an incompatible tool. Besides, the compatible tool and compatible adapter are each a unified tool.

Figure 8:
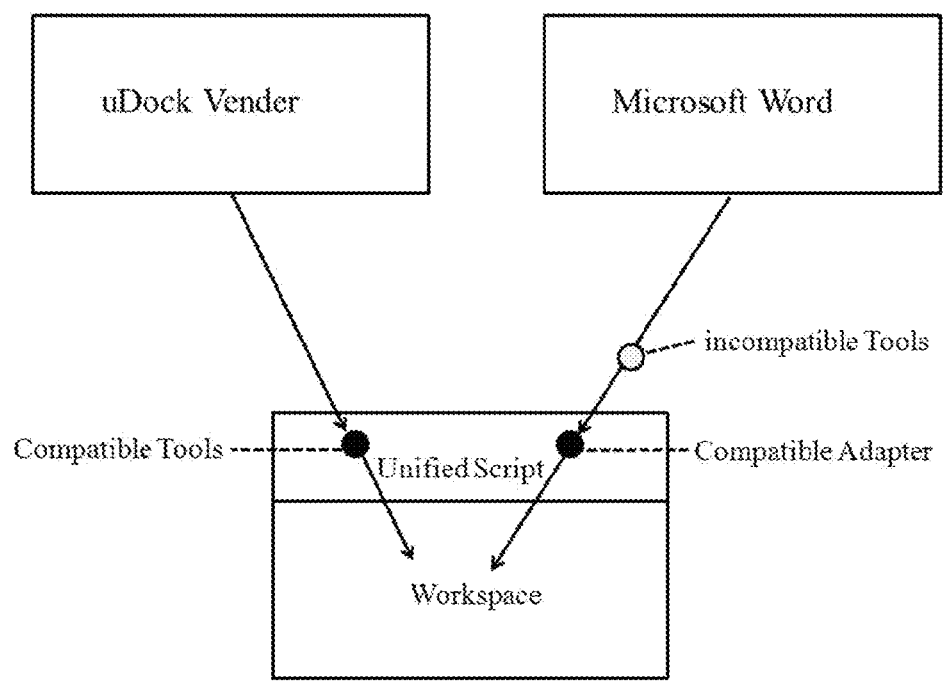
FIG. 8 is an example for dealing with compatible and incompatible tools in the workspace.

As shown in FIG. 8, it elaborates the step 120 of FIG. 6 how to perform compatible and incompatible tools in the same workspace as follows:

Condition for Compatible Tool:

If the component interface of a tool is compatible with the component architecture for the unified tool in the workspace, the tool is supposedly a compatible unified tool and may be able to be directly plugged and equipped with a specific function through the use of the unified Script.

Condition for Incompatible Tool:

If a tool with component interface (such as Microsoft Word) is incompatible with the component architecture, it requires an adapter compatible with the above architecture in the workspace. Then, the incompatible tool is indirectly plugged and equipped with a specific function via the compatible adapter in the workspace. After that, compatible tool and incompatible tool can be unified into the same workspace to complete certain tasks.

The workspace can be equipped with many unified tools. Each of the tools provides a functional feature(s) which displays or interprets for a particular unified information unit.

After the unified Script unified the at least one tool into a unified tool, a task would be accomplished by the use of at least one unified tool to process a corresponding unified information unit. Besides, discussing the representation of the present unified tool, a recognizable icon or visible object is for remarking its operable function. An example of the unified tool is, but not limited to, a card icon and each unified tool is equipped with a specific function.

Figure 9:
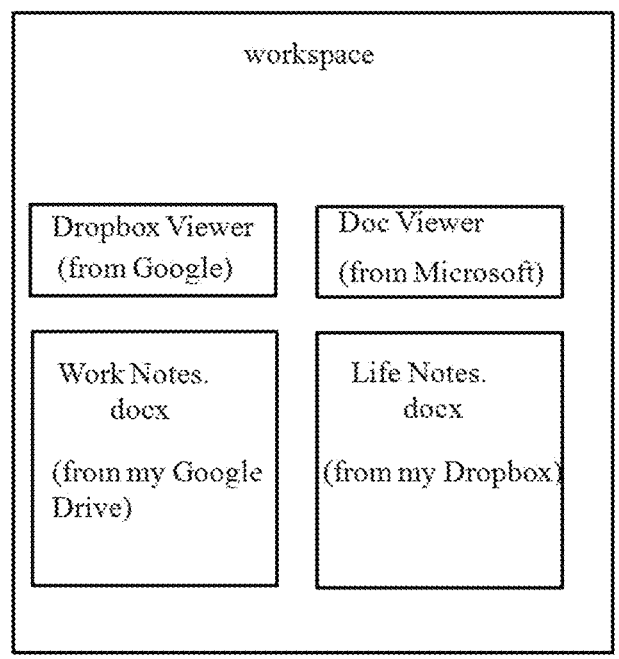
FIG. 9 is a diagram showing an arrangement of placing two unified information units and two unified tools in the personal workspace according to one embodiment of the present invention.

As shown in FIG. 9, the step 130 of FIG. 6 is effect which comprises arranging the at least one unified information unit (such as Work Notes.docx from Google Drive and Life Notes.docx from Dropbox) and the at least one unified tool (such as Doc Viewer from Google and Microsoft) in the workspace. In one embodiment, arranging process in the step (iii) includes (1) the step of grouping and placing the at least one unified information unit or the at least one unified tool in a specific area of the workspace; or (2) the step of adding or deleting the at least one unified information unit or the at least one unified tool in the workspace to meet variant requirements of the users.

The step 140 of FIG. 6 is effected which comprises performing the task for accessing or controlling the at least one unified information unit by using the at least one unified tool.

Once the operation relationship is set up between the unified tool and the unified information unit (such as clicking or drag actions between the two), the user performs the specific task.

Figure 10:
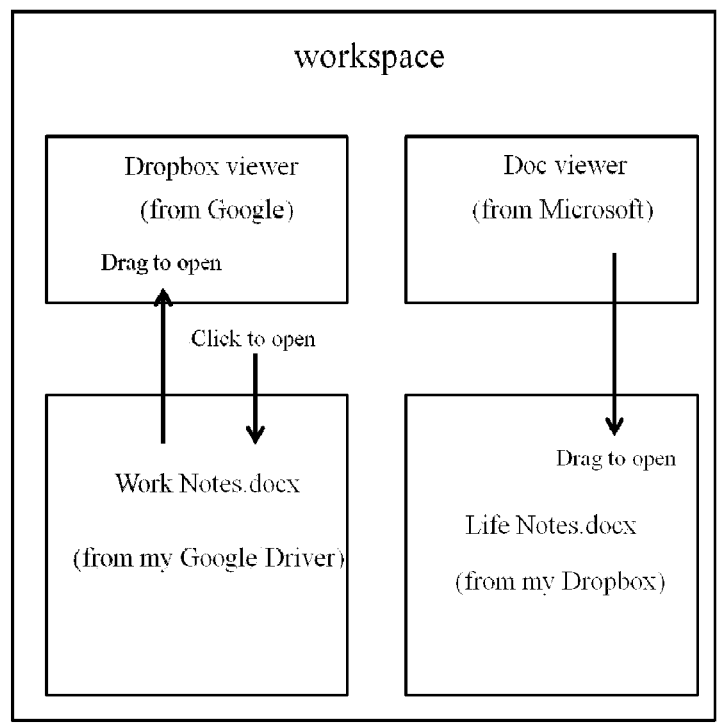
FIG. 10 illustrates processing of a unified information unit with a unified tool and interacting between a unified tool and a unified information unit according to one embodiment of the present invention.

FIG. 10 illustrates examples of processing a unified information unit with a unified tool and interacting the unified tool and the unified information unit according to one embodiment of the present invention.

If the user is willing to view one unified information unit (such as Work Notes.docx from Google Drive) or another unified information unit (such as Life Notes.docx from Dropbox), two unified tools, including Doc Viewer from Google and Doc Viewer from Microsoft, are necessarily introduced in the workspace. Then, some view actions in the workspace are thus associated with clicking or drag actions.

For example, the user directly clicks one of the Work Notes.docx and Life Notes.docx, and the workspace selects a supporting unified tool for viewing the clicked file upon the clicked file attribute. Alternatively, setting up several drag actions between the unified information unit and the unified tool for viewing the expected information source is another choice. In particular, the above drag actions include three conditions as follows:

Condition 1: dragging the unified information unit to be accessed or controlled and dropping the same to the unified tool for accessing or controlling;

Condition 2: dragging the unified tool for accessing or controlling and dropping the same to the unified information unit to be accessed or controlled; and.

Condition 3: the unified information unit, severing as a self-driving unit, to cooperate with the at least one unified tool to complete task In addition, it can combine the features of some unified tools with a unified information unit into one package, if any. Thus, it is easier for the user to do specific tasks, such as searching/completing content in files in a particular project.

Those skilled in the art recognize the foregoing outline as a description of the method for communicating hosted application information. The skilled artisan will recognize that these are illustrative only and that many equivalents are possible.

What is claimed is:

1. A method for performing a task on at least one unified information unit in a personal workspace of a digital processing device, comprising:

plugging and equipping at least one information importer and at least one unified tool into the personal workspace via a unified script, wherein the at least one unified tool is modeled from at least one tool with one unified data model via retrieving and re-organizing attributes and an associated link of the at least one tool from a first external information source without downloading the at least one tool to where the personal workspace is installed, wherein the one unified data model serves for modeling format of the at least one tool, and wherein the unified tool is directly produced according to the attributes and the associated link when the unified tool obtained from the first external information source is compatible with an execution environment of a unified website platform hosted by the personal workspace, and the unified tool is indirectly produced via an adapter to execute interface implementation with the unified website platform hosted by the personal workspace and via a software development kit of the tool when the unified tool obtained from the first external information source is incompatible with the execution environment of the unified website platform hosted by the personal workspace;

providing, by the at least one information importer, an access scheme to retrieve attributes and an associated link from at least one information requested from a second information source, and generating the at least one unified information unit via the at least one information importer by modeling the at least one information with another unified data model via re-organizing the attributes and the associated link of the at least one information, wherein the another unified data model serves for modeling format of the at least one information;

arranging the at least one unified information unit in the personal workspace; and performing the task, which is accessing or controlling the at least one unified information unit by using the at least one unified tool;

wherein while the at least one unified tool is used in the personal workspace to access or control the at least one unified information unit, the corresponding at least one tool is accessing or controlling the at least one information; and wherein the personal workspace is a centralized interface allowing information and tools from different external information sources to be equipped and to cooperate therein.

2. The method of claim 1, wherein the step of the arranging is to add or delete the at least one unified information unit in the personal workspace.

3. The method of claim 1, wherein the step of the arranging is to load or unload the at least one unified tool in the personal workspace.

4. The method of claim 1, wherein the step of arranging further comprises grouping and placing the at least one unified information unit or the at least one unified tool in a specific area of the personal workspace.

5. The method of claim 1, wherein the first and second external information sources are selected from internet services, non-transitory computer usable storage mediums, or mobile device storage mediums.

6. The method of claim 1, wherein the information is a file, web page, database row, policy, or rule.

7. The method of claim 1, wherein the at least one tool is a utility, widget, intelligent agent, application, or service.

8. The method of claim 1, wherein a preset one of the at least one unified tool that supports the unified information unit is automatically selected by the personal workspace according to an attribute of the unified information unit for accessing or controlling the unified information unit.

9. The method of claim 1, wherein the unified information unit is dragged toward and dropped onto a selected one of the at least one unified tool in the personal workspace for accessing or controlling the unified information unit.

10. The method of claim 1, wherein a selected one of the at least one unified tool is dragged toward and dropped onto the unified information unit for accessing or controlling the unified information unit.

11. The method of claim 1, wherein the personal workspace is a working environment or platform that further comprises a microkernel to host the at least one unified information unit and the at least one unified tool.

12. The method of claim 11, wherein the microkernel is configurable via the unified script as an intermediate language to plug and equip the at least one information importer and the at least one unified tool.

13. The method of claim 1, wherein the unified information unit is directly produced when the attributes accessible from the original information correspond to attributes to be unified in the unified information unit.

14. The method of claim 1, further comprising, before modeling, re-defining the at least one information with respect to the accessible attributes to correspond to the one unified data model in terms of attributes to be unified in the unified information unit via logically re-organizing the attributes and associated link into a new information, thereby indirectly producing the unified information unit, provided that the attributes accessible from the at least one information does not correspond to the attributes to be unified in the unified information unit.

15. A method for performing a task on at least one unified information unit in a personal workspace of a digital processing device, wherein the personal workspace is a working environment or platform to host at least one unified information unit and at least one unified tool, and the method comprising:

providing, by at least one matterizer, an access scheme to retrieve attributes and an associated link from at least one information and/or at least one tool requested from a plurality of information sources;

plugging and equipping the at least one matterizer into the personal workspace;

generating the at least one unified information unit and/or the at least one unified tool via the at least one matterizer, wherein the at least one unified information unit is generated by modeling the at least one information with one unified data model via re-organizing the attributes and the associated link of the at least one information, and the at least one unified tool is generated by modeling the at least one tool with another unified data model via re-organizing the attributes and the associated link of the at least one tool, without downloading the at least one tool to where the personal workspace is installed, wherein the another unified data model serves for modeling format of the at least one information, and wherein the unified tool is directly produced according to the attributes and the associated link when the unified tool obtained from an external information source is compatible with an execution environment of a unified website platform hosted by the personal workspace, and the unified tool is indirectly produced via an adapter to execute interface implementation with the unified website platform hosted by the personal workspace and via a software development kit of the tool when the unified tool obtained from the external information source is incompatible with the execution environment of the unified website platform hosted by the personal workspace;

arranging the at least one unified information unit and/or the at least one unified tool in the personal workspace; and performing the task, which is accessing or controlling the at least one unified information unit by using the at least one unified tool;

wherein while the at least one unified tool is used in the personal workspace to access or control the at least one unified information unit, the corresponding at least one tool is accessing or controlling the at least one information; and wherein the personal workspace is a centralized interface allowing information and tools from different external information sources to be equipped and to cooperate therein.

* * * * *